US006581036B1

(12) United States Patent
Varney, Jr.

(10) Patent No.: US 6,581,036 B1
(45) Date of Patent: Jun. 17, 2003

(54) SECURE REMOTE VOICE ACTIVATION SYSTEM USING A PASSWORD

(75) Inventor: Gordon H. Varney, Jr., Jackson, MO (US)

(73) Assignee: Var LLC, Jackson, MO (US)

( * ) Notice: Subject to any disclaimer, the term of this patent is extended or adjusted under 35 U.S.C. 154(b) by 3 days.

(21) Appl. No.: 09/692,651

(22) Filed: Oct. 19, 2000

Related U.S. Application Data

(63) Continuation-in-part of application No. 09/420,670, filed on Oct. 19, 1999.
(60) Provisional application No. 60/104,942, filed on Oct. 20, 1998.

(51) Int. Cl.[7] .......... G10L 15/22
(52) U.S. Cl. .......... 704/275; 704/270
(58) Field of Search .......... 704/270, 275

(56) References Cited

U.S. PATENT DOCUMENTS 5,040,212 A * 8/1991 Bethards .......... 704/246
5,247,580 A * 9/1993 Kimura et al. .......... 704/275
5,777,571 A * 7/1998 Chuang .......... 341/176
5,878,394 A * 3/1999 Muhling .......... 704/275
6,119,088 A * 9/2000 Ciluffo .......... 704/275
6,199,044 B1 * 3/2001 Ackley et al. .......... 704/275

FOREIGN PATENT DOCUMENTS

DE 3115521 * 12/1982 .......... H04Q/9/00

* cited by examiner

*Primary Examiner*—Talivaldis Ivars Šmits
(74) *Attorney, Agent, or Firm*—Thomas M. Fisher, Esq.; Armstrong Teasdale LLP

(57) ABSTRACT

A method of secure remote control by voice wherein the digitization and speech recognition functions are separated, which involves receiving an audible voice password in a remote controller, digitizing the voice password, and transmitting the digitized voice password and an ID from the controller to a base station. The method also includes confirming the ID and the password in the base station, receiving an audible voice command in the controller, and digitizing the command. The method still further includes transmitting the digitized command from the controller to the base station, confirming the command to indicate transmission of a desired control signal by the base station, and transmitting the control signal from the base station in response to the command.

30 Claims, 16 Drawing Sheets

SECURE REMOTE VOICE ACTIVATION SYSTEM USING A PASSWORD

CROSS REFERENCE TO RELATED APPLICATIONS

This application is a continuation-in-part of U.S. patent application Ser. No. 09/420,670 filed Oct. 19, 1999 which claims the benefit of U.S. Provisional Patent Application serial No. 60/104,942 filed Oct. 20, 1998.

BACKGROUND OF THE INVENTION

This invention relates generally to remote activation systems and, more particularly, to remote voice activation systems.

Many electronic interface control systems require a user initiated input. The user-initiated input may entail, but is not limited to, a keystroke, switch actuation, or a variable adjustment level output. For many applications these inputs are captured by electronic circuitry and transmitted from a remote location via electrical hardwire connections to a receiving device to initiate some operation or to transfer data. In other applications the user-initiated input is transmitted by a wireless communication method to the receiving device. The method of wireless communication can be RF, IR, or other wireless communication format. For example, a garage door opener is typically such a device. Other examples include, remote controls for audiovisual systems, remote activation devices for automobile anti-theft systems, remote door unlock devices for automobiles, remote engine start devices for automobiles, and many other similar examples.

The introduction of voice activation technology into electronic interface control systems that require a user initiated input is known for hardwired communication systems. These systems typically entail a power source, an analog audible sensing device (for sensing a user initiated audible command input), and an audio receiving device in electrical communication with an audio amplifier transmitting what is typically an analog audio signal via hardwire to a receiving device. The receiving device filters and digitizes the signal with an electronic audio filtering and digitizing circuit. In addition, the receiving device includes a speech recognition microchip with supporting electronic devicesl capturing the digitized audio signal and comparing the signal's electronic profile with signal profiles that have been previously stored. If the digitized signal matches a previously stored signal profile the signal is deemed valid and a control signal will be output from the voice recognition receiving device identifying a particular control command. Access to a hard wired interface can be easily controlled by conventional means such as physically restricting an area from unauthorized users. However, access to a remote control unit is less controllable because the remote is typically small and can be lost or misplaced.

Accordingly, a need exists for a secure remote voice activation system wherein a lost remote is not useable by a finder of the remote.

BRIEF SUMMARY OF THE INVENTION

A method of remotely generating a control signal prompted by an audible voice command includes transmitting an ID from a remote controller to a base station and confirming the ID. After receiving an audible voice password in the controller, the password is digitized and transmitted from the controller to the base station. The base station confirms the password and enables receipt of a digitized voice command if the password is valid. The method still further includes transmitting the digitized command from the controller to the base station, confirming the command to indicate transmission of a desired control signal by the base station, and transmitting the control signal from the base station in response to the command. Accordingly, if the controller is lost, a finder does not know the password and will not be able to use the remote.

DETAILED DESCRIPTION OF THE INVENTION

Figure 1:
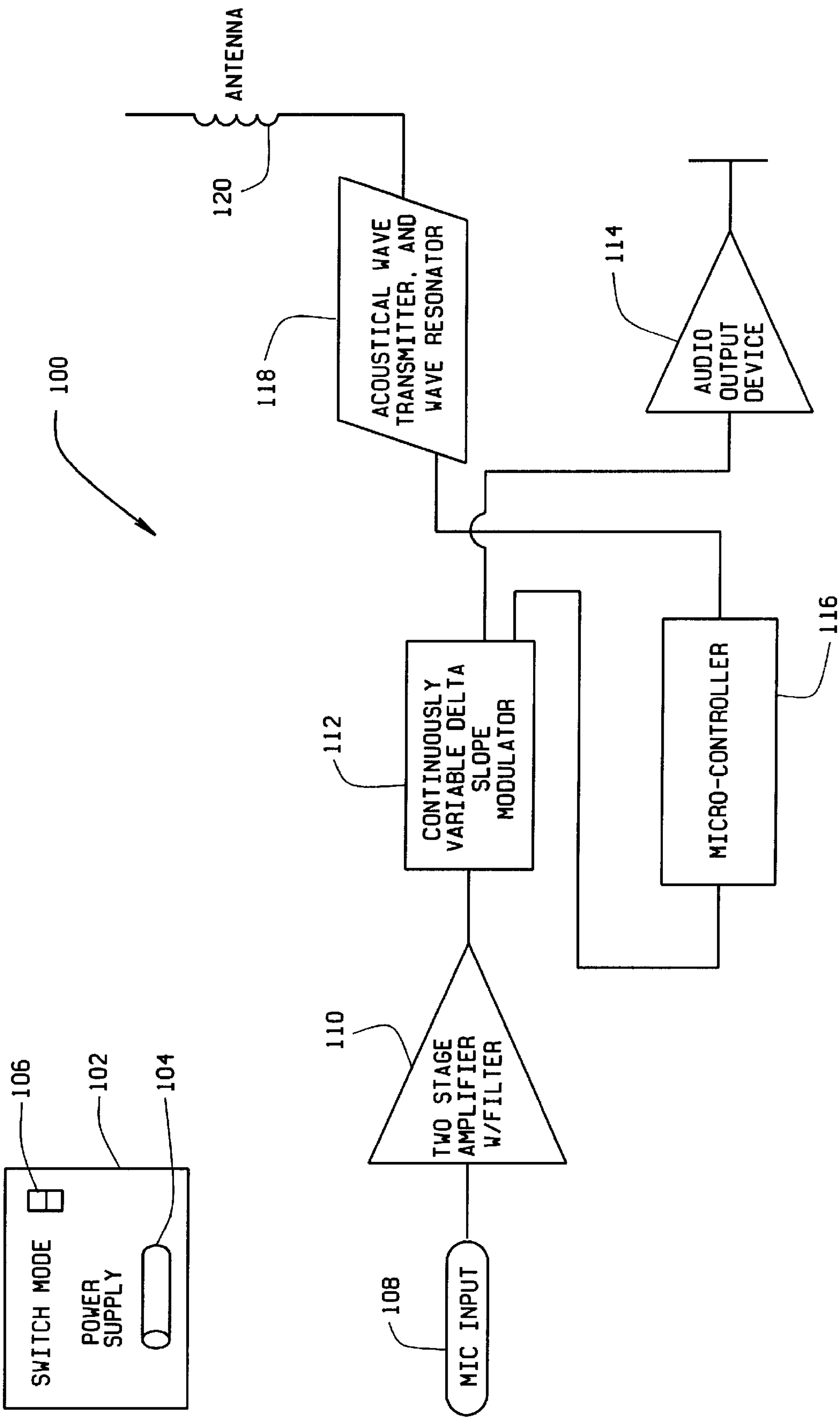
FIG. 1 is a block diagram of a controller.

FIG. 1 is a block diagram of a controller 100 for one embodiment of a secure remote voice activation system (not shown in FIG. 1). Controller 100 includes a switch mode power supply 102 including a battery 104 and a switch or relay 106 having an open state (not shown) and a closed state (not shown). Controller 100 further includes a microphone input 108 electrically connected to a two stage filtered amplifier 110. Amplifier 110 is electrically connected to a Continuously Variable Slope Delta-modulation modulator (CVSD) 112 which is electrically connected to an audio output device 114 and a micro-controller 116. Micro-controller 116 is electrically connected to an acoustical wave transmitter/wave resonator 118 (WTWR) which is electrically connected to an antenna 120.

During operation of controller 100, a user (not shown) activates switch 102 and speaks into microphone 108 first giving a password and then issuing a voice command. Amplifier 110 amplifies both the password and the voice command. A continuously variable slope delta modulator (CVSD) 112 digitizes the amplified password and voice command, and then CVSD 112 encodes the digitized password and voice command. In one embodiment, CVSD 112 Manchester encodes the digitized password and voice command. WTWR 118 transmits the encoded digitized password and command utilizing antenna 120. In an exemplary embodiment, the password and command are encrypted by micro-controller 116 before being encoded. Micro-controller 116 controls CVSD 112 and WTWR 118, and, in an exemplary embodiment, when switch 106 is closed, micro-controller 116 uses antenna 120 and WTWR 118 to receive wireless signals in the range of 910 to 920 Megahertz (MHZ) and then searches for an encoded signal. In one embodiment, if a Manchester clock is derived from any signal received, then micro-controller 116 does not transmit any of the ID, the password, and the command. Accordingly, data collision between multiple controllers is avoided.

However, if no clock is derived from any signal received, then micro-controller 116 transmits the ID and the password and waits for confirmation from a base station that the ID and password are valid before sending the encoded digitized voice command to the base station. In one embodiment, the clock to be derived is a Manchester clock that recognizes a Manchester encoded signal. The base station confirms the ID by echoing back the micro-controller transmitted ID to micro-controller 116. Upon receipt of the echoed back ID, micro-controller 116 transmits the command to the base station. In an alternative embodiment, micro-controller 116 transmits the ID and waits for a confirmation from a base station (not shown in FIG. 1) that the ID is a valid ID. Upon receiving the confirmation, micro-controller 116 transmits the encoded digitized password and command to the base station. In another embodiment, micro-controller 116 transmits the ID and, after receiving a confirmation signal, controller 100 emits an audible signal from audio output device 114. The user hears the audible signal and says the password and command. It is to be understood that encoding other than Manchester encoding could be used with the above described system.

Figure 2:
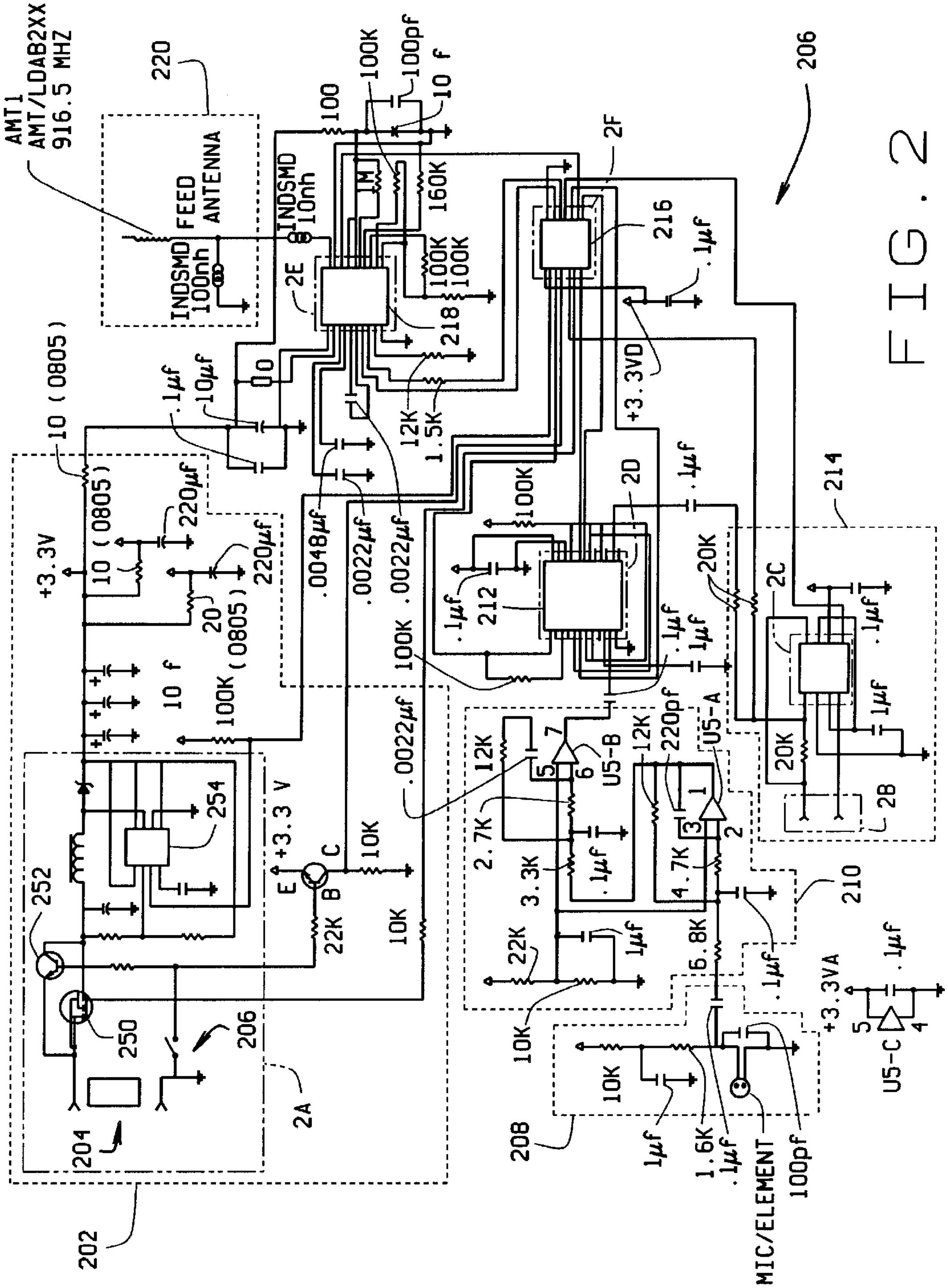
FIG. 2 is a schematic diagram of a circuit exemplifying one embodiment of the controller shown in FIG. 1.

FIG. 2 is a schematic diagram of a circuit 200 exemplifying one embodiment of controller 100 (shown in FIG. 1). Circuit 200 includes a power supply circuit 202 including a battery 204 and a push-to-talk (PTT) switch 206. Circuit 200 further includes a microphone input 208 electrically connected to an amplifier 210 that is electrically connected to a CVSD unit 212. Unit 212 is electrically connected to an audio output 214 and a micro-controller unit 216 that is electrically connected to a WTWR unit 218. WTWR unit 218 is further electrically connected to an antenna 220.

Since circuit 200 is an exemplary embodiment of controller 100 (shown in FIG. 1), during operation of circuit 200, power supply circuit 202 operates as explained above regarding power supply 102 and PTT 206 operates as switch 106. Accordingly, a user (not shown) activates switch 202 and speaks into microphone 208 first giving a password and then issuing a voice command. Amplifier 210 amplifies both the password and the voice command. CVSD unit 212 digitizes the password and voice command. CVSD unit 212 then encodes the digitized password and voice command. WTWR unit 218 transmits the encoded digitized password and command utilizing antenna 220. In one embodiment, the password and command are encrypted by micro-controller 216 before being encoded. Micro-controller unit 216 controls CVSD unit 212 and WTWR unit 218, and when switch 206 is closed, micro-controller unit 216 utilizes antenna 220 and WTWR unit 218 to receive wireless signals in the range of 910 to 920 Megahertz (MHZ) and then searches for an encoded signal. If a clock is derived from any signals received, then micro-controller unit 216 does not transmit any of the ID, the password, and the command. Accordingly, data collision between multiple controllers is avoided.

Power supply circuit 202 further includes an N-Channel mosfet 250 connected to a terminal (not shown) of battery 204, and a pnp transistor 252 connected to battery 204 in parallel with mosfet 250. Transistor 252 is also connected to a switch mode power supply 254 with boost mode topology. Power supply 254 is electrically connected to micro-controller 216.

During operation of controller 100 including circuit 200, power from battery 204 is not applied to any active circuitry of circuit 200 and is held off by a lack of gate voltage to mosfet 252. When a user (not shown) closes PTT switch 206, transistor 250 conducts voltage to switch mode power supply 254. Since switch mode power supply 254 has boost mode topology, a primary supply voltage is stepped up to a higher voltage that is supplied to micro-controller 216. Micro-controller 216 initializes and sets a power up pin high (not shown), supplying a gate voltage to mosfet 252. An N-Channel (not shown) of mosfet 252 conducts electricity which reduces a loss of voltage through transistor 252 and provides control of power supply 254 to micro-controller 216. The user may at this time open PTT switch 206 and circuit 200 retains power for a preset time period. Micro-controller 216 monitors PTT switch 206 for activity and allows transmission of audio signals to the base station only after receiving confirmation of a valid ID and password. In an alternative embodiment, micro-controller 216 monitors PTT switch 206 for activity and allows transmission of audio signals to the base station only after receiving confirmation of a valid ID.

Figure 2A:
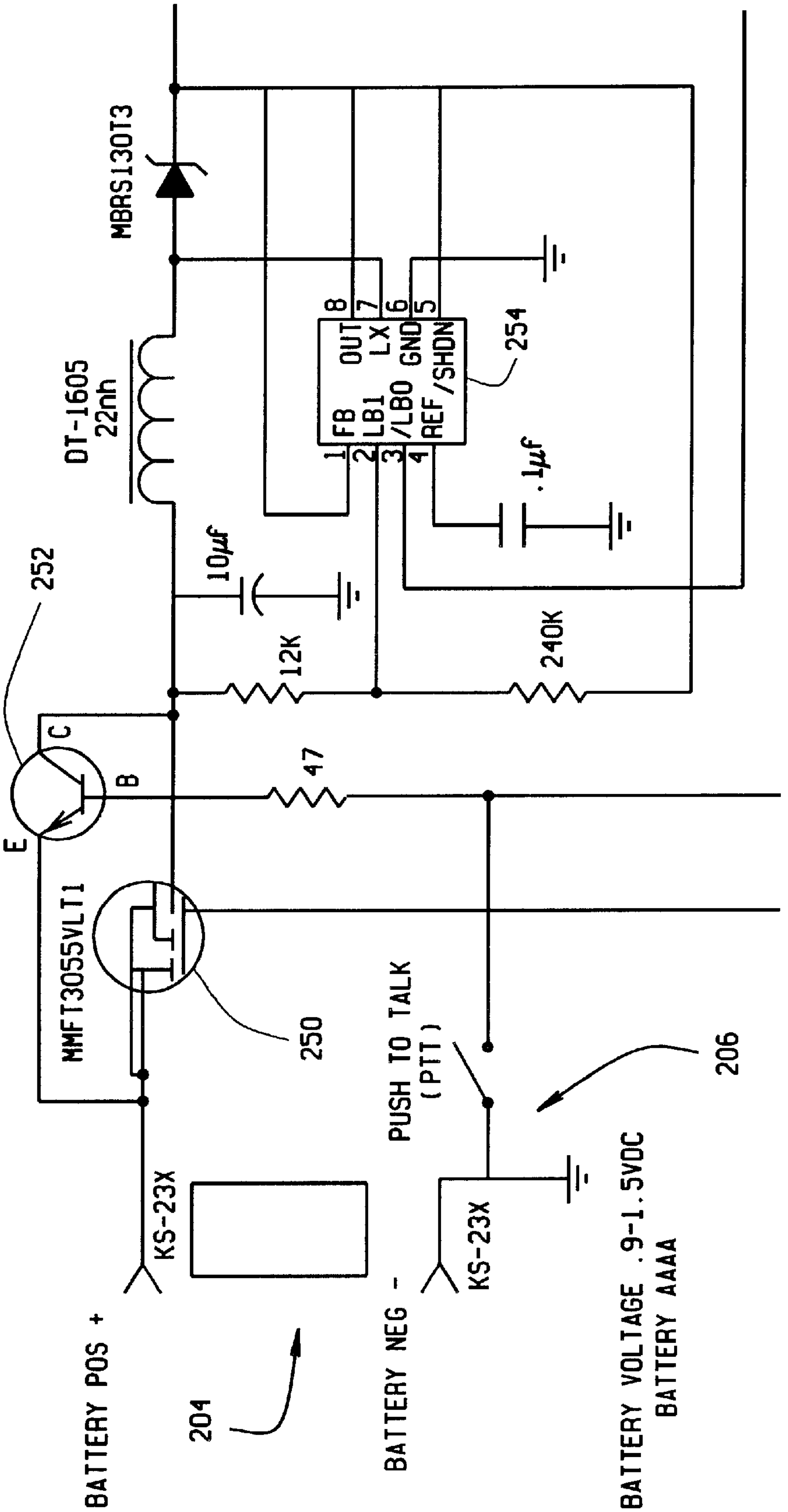
FIG. 2A is an enlarged view of the switch mode power supply shown in FIG. 2.
Figure 2B:
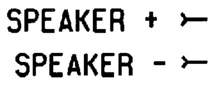
FIG. 2B is an enlarged view of one portion of the audio output shown in FIG. 2.
Figure 2C:
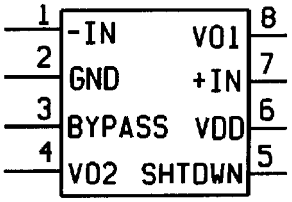
FIG. 2C is an enlarged view of another portion of the audio output shown in FIG. 2.
Figure 2D:
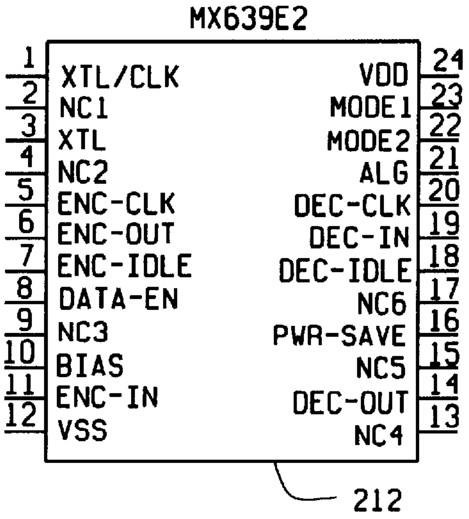
FIG. 2D is an enlarged view of the CVSD unit shown in FIG. 2.
Figure 2E:
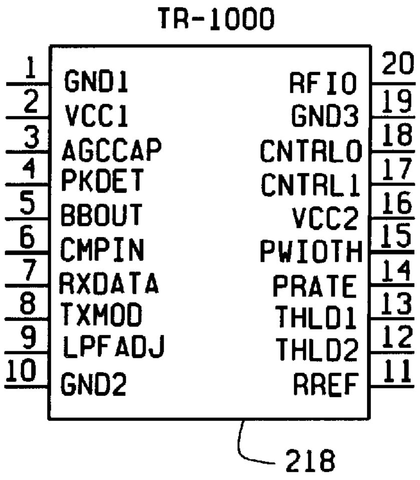
FIG. 2E is an enlarged view of the WTWR unit shown in FIG. 2.
Figure 2F:
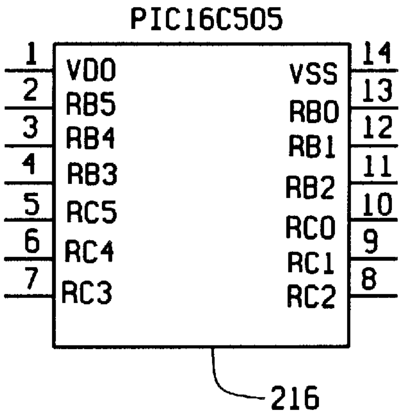
FIG. 2F is an enlarged view of the micro-controller shown in FIG. 2.

FIG. 2A is an enlarged view of the switch mode power supply 254 (shown in FIG. 2). FIG. 2B is an enlarged view of one portion of the audio output 214 (shown in FIG. 2). FIG. 2C is an enlarged view of another portion of the audio output 214 (shown in FIG. 2). FIG. 2D is an enlarged view of the CVSD unit 212 (shown in FIG. 2). FIG. 2E is an enlarged view of the WTWR unit 218 (shown in FIG. 2). FIG. 2F is an enlarged view of the micro-controller 216 (shown in FIG. 2).

Figure 3:
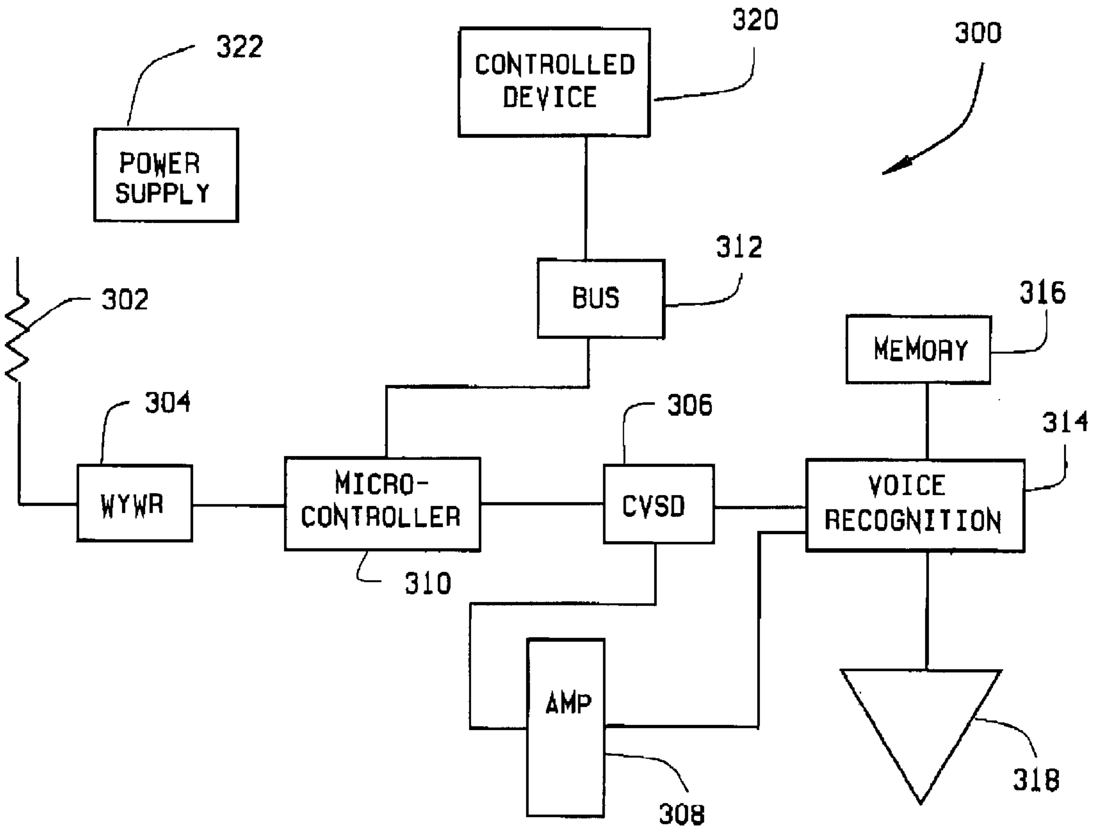
FIG. 3 is a block diagram of a base station.

FIG. 3 is a block diagram of a base station 300 for one embodiment of a speech recognition system (not shown in FIG. 3). Base station 300 includes an antenna 302 electrically connected to an acoustical wave transmitter and wave resonator (WTWR) 304 which is electrically connected to a micro-controller 310. Micro-controller is electrically connected to a serial bus interface 312 and a CVSD 306. CVSD 306 is electrically connected to an amplifier 308 and a micro-controller 310 electrically connected to a serial bus interface 312. Micro-controller 310 is further electrically connected to a speech recognition unit 314 that is connected to a memory unit 316 and an audio output 318. Bus 312 is coupled (such as by one of mechanically, electrically, phonically, and optically) to a controlled device 320. In an exemplary embodiment, controlled device includes a control module (not shown) and bus 312 is electrically coupled to the control module. Base station 300 further includes a power supply 322.

During operation of base station 300, WTWR 304 receives input from antenna 302. Upon receipt of an active signal, WTWR 304 provides a signal received indication (not shown) to micro-controller 310. Micro-controller 310 looks for a valid ID after micro-controller 310 receives the signal received indication. The digital ID is received and decoded by micro-controller 310 to confirm whether or not the ID is valid by comparing the decoded ID with at least one stored ID. In addition, micro-controller 310 receives a password which is converted from a digital to an analog signal by CVSD 306. The analog signal is sent to speech recognition unit 314, which compares the password analog signal to at least one password stored in memory 316. If a valid password is found, an audible voice command is then received. Each time an audible signal is received, micro-controller 310 enables CVSD 306 to receive a new input (not shown) by cycling a clock input (not shown). After receiving an audible voice command, the command is converted to analog and compared to at least one audible profile of a pre-set voice command stored in memory 316. If a valid command is received, a control signal is provided to micro-controller 310 and then from micro-controller 310 to serial bus 312 and from serial bus 312 to the controlled device 320. If a valid password was just previously received before receiving the command control signal, a control signal command output is provided enabling subsequent commands to be received for a predetermined time. In an alternative embodiment, when a valid command is received, audio output 318 generates an audible confirmation. In an exemplary embodiment, the audible confirmation is phonemic such as, for example "alarm activated". In an alternative embodiment, the audible confirmation is non-phonemic such as, for example, a beep. In a further alternative embodiment, controller 100 (shown in FIG. 1) generates the audible confirmation.

Figure 4:
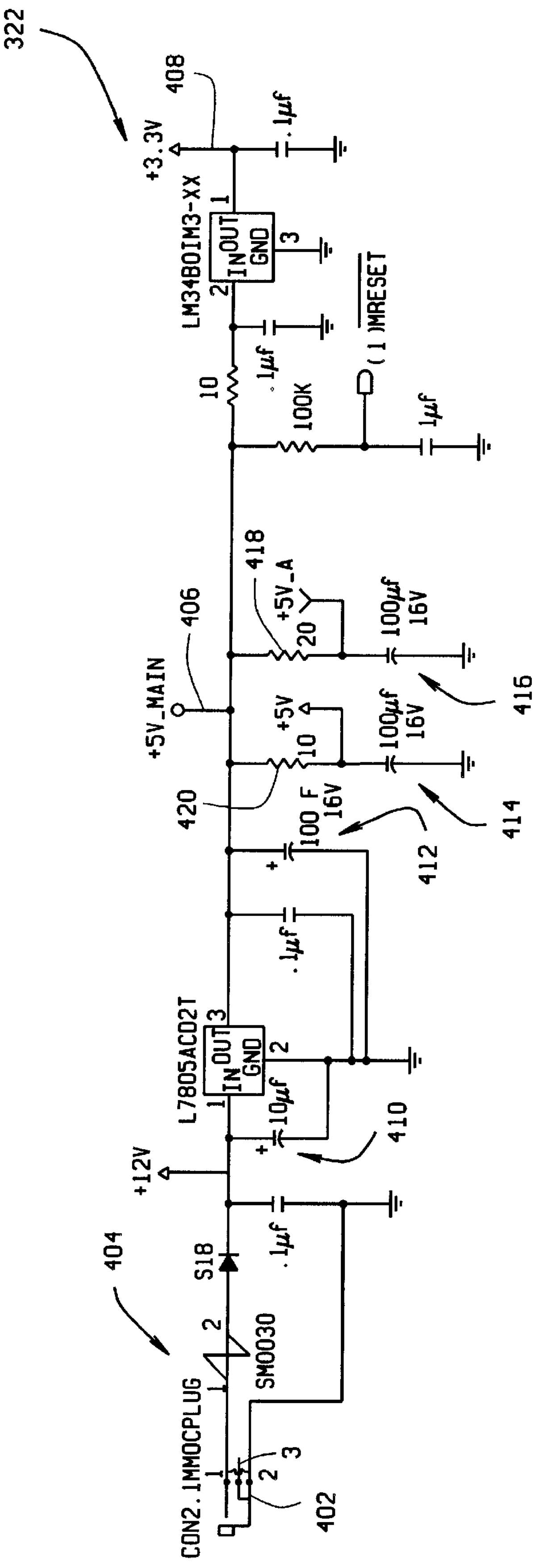
FIG. 4 is a schematic diagram of the power supply shown in FIG. 3.

FIG. 4 is a schematic diagram of power supply 322 with 12 volt DC input from a transformer plugged into a standard household current outlet (not shown) or a 12 volt battery connection 402. Power supply 322 includes an on/off switch 404. When switch 404 is on, power supply 322 provides a 5 volt DC power feed 406 and a 3.3 volt power supply feed 408 for base station 300 (shown in FIG. 3). Power supply 322 includes bypass capacitors 410 and 412 and voltage hold-up capacitors 414 and 416. Power supply 322 further includes two pull-up resistors 418 and 420.

Figure 5:
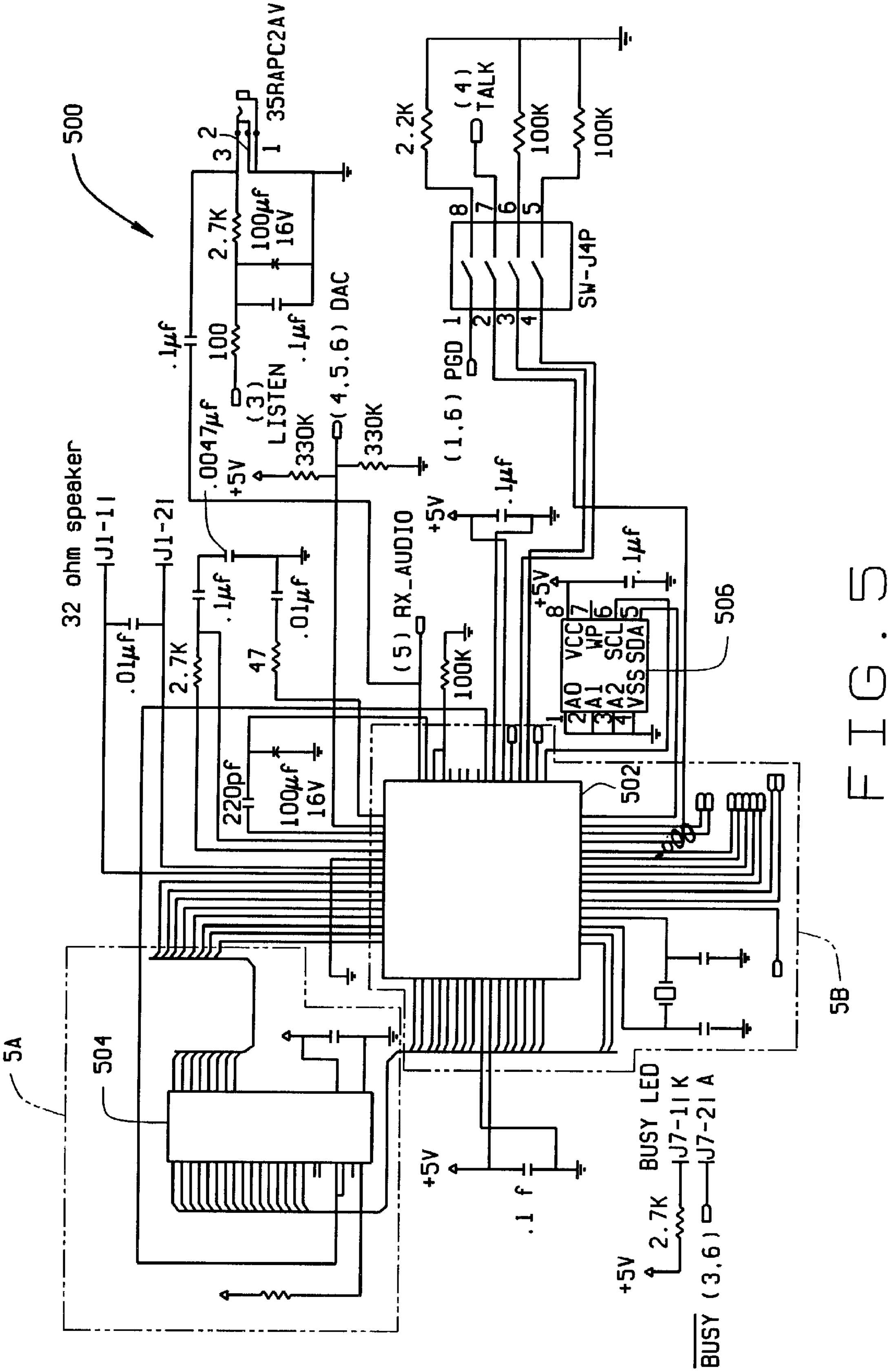
FIG. 5 is a schematic diagram of a speech recognition unit exemplifying one embodiment of the speech recognition unit shown in FIG. 3.

FIG. 5 is a schematic diagram of a voice recognition unit 500 that exemplifies one embodiment of speech recognition unit 314 (shown in FIG. 3). Unit 500 includes a speech recognition chip 502, a memory storage unit 504 for voice prompt patterns, and a memory storage device 506 for passwords, at least one ID, and commands needed to control controlled device 320 (shown in FIG. 3).

Figure 5A:
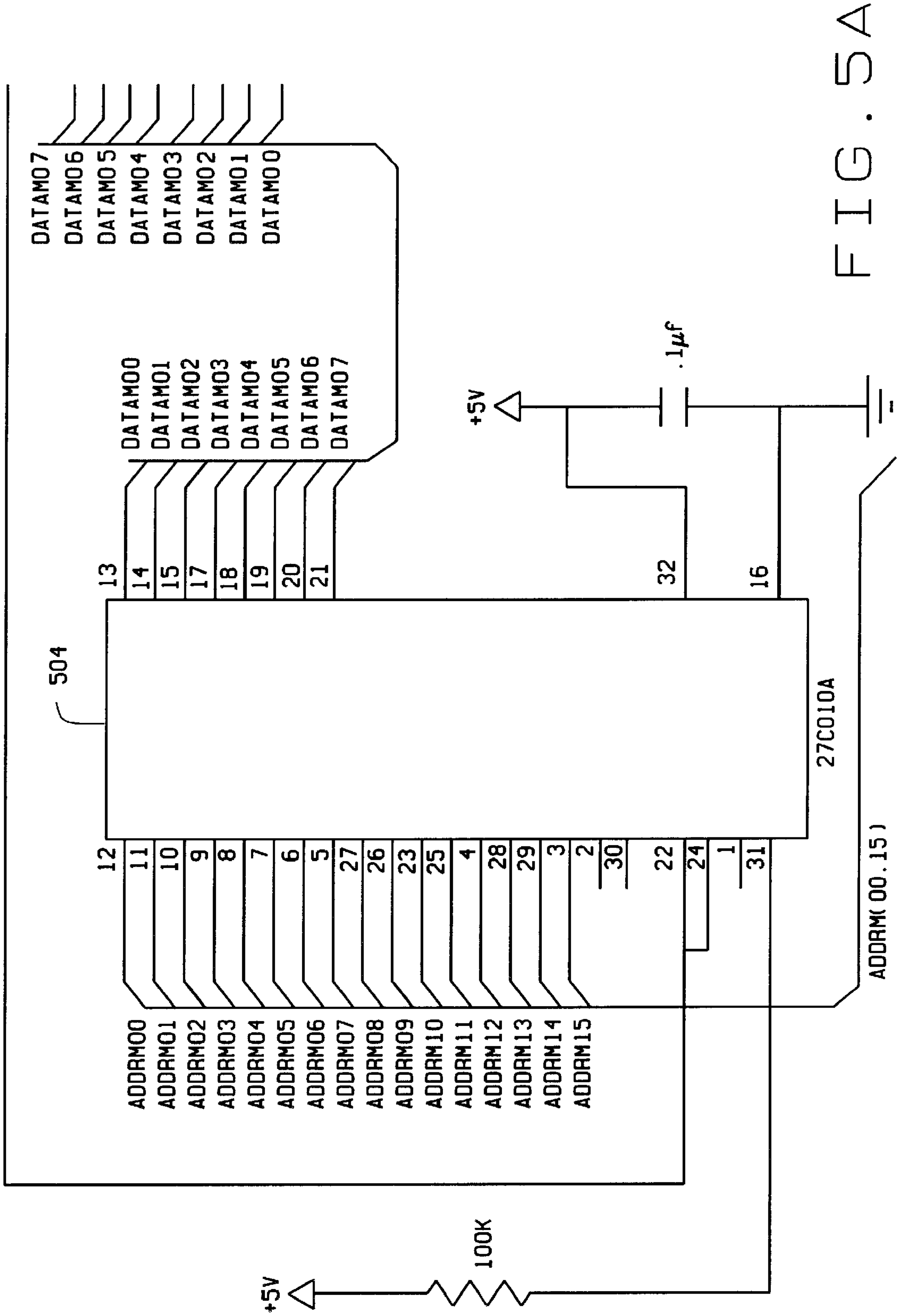
FIG. 5A is an enlarged view of the memory storage unit shown in FIG. 5.
Figure 5B:
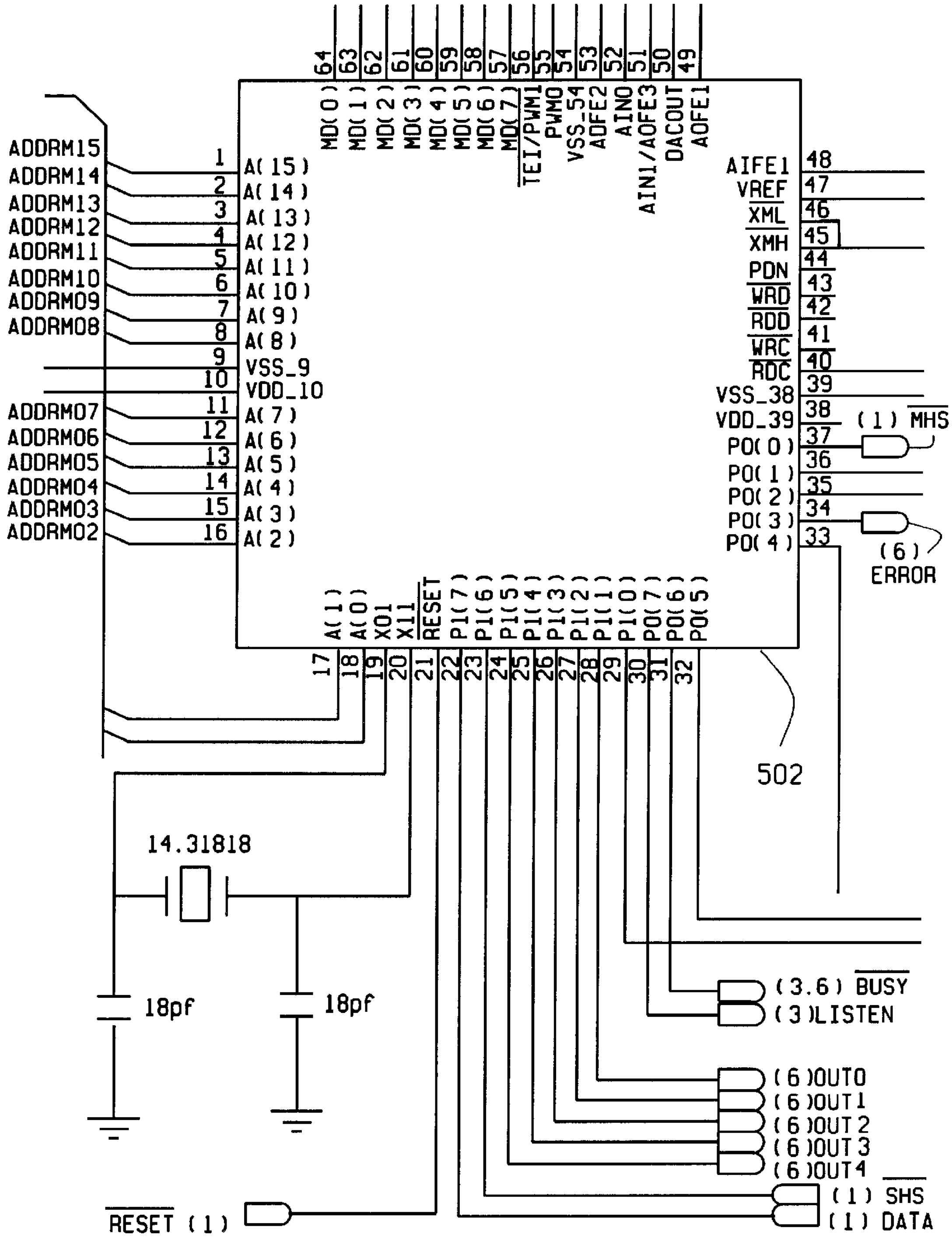
FIG. 5B is an enlarged view of the speech recognition chip shown in FIG. 5.
Figure 6:
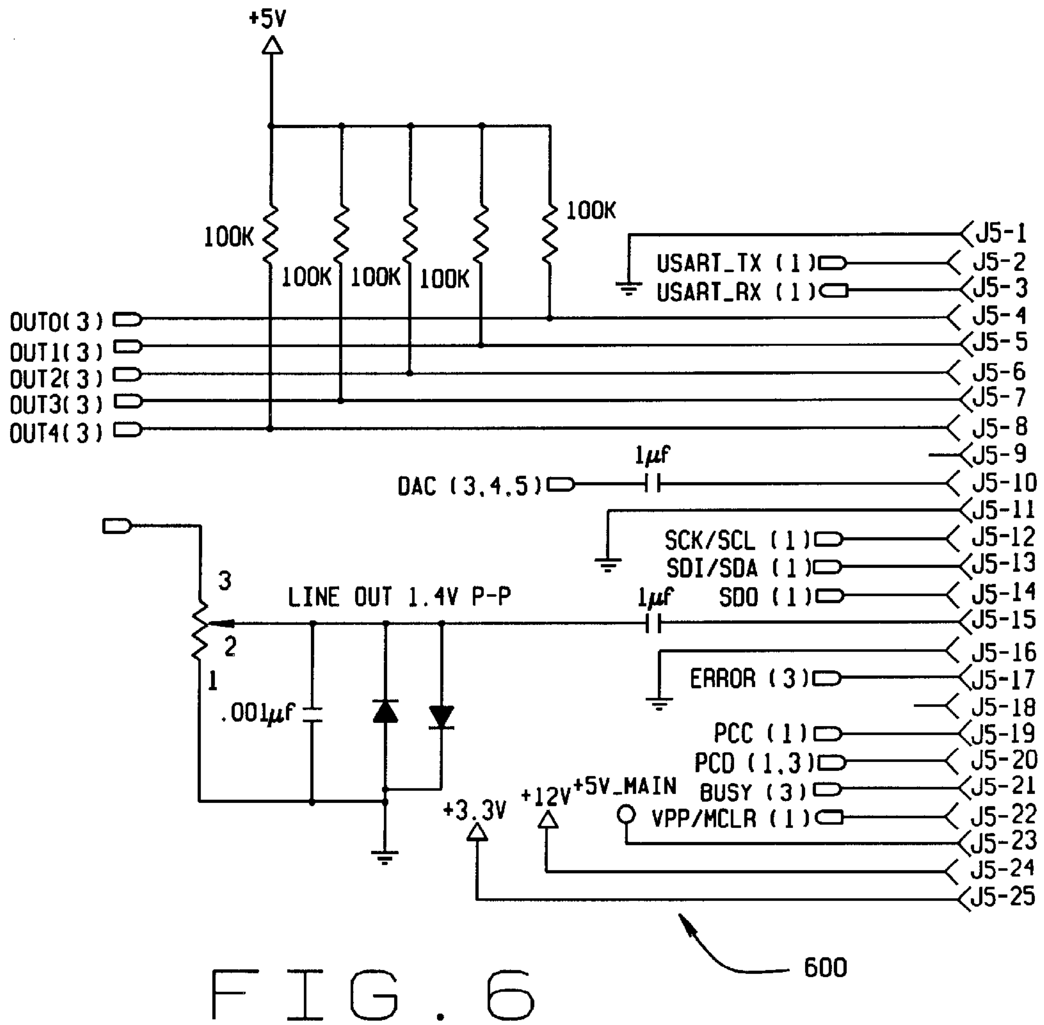
FIG. 6 is a schematic diagram of an input/output connector exemplifying one embodiment of the serial bus interface shown in FIG. 3.

FIG. 5A is an enlarged view of memory storage unit 504 (shown in FIG. 5), and FIG. 5B is an enlarged view of speech recognition chip 502 (shown in FIG. 5).

Figure 7:
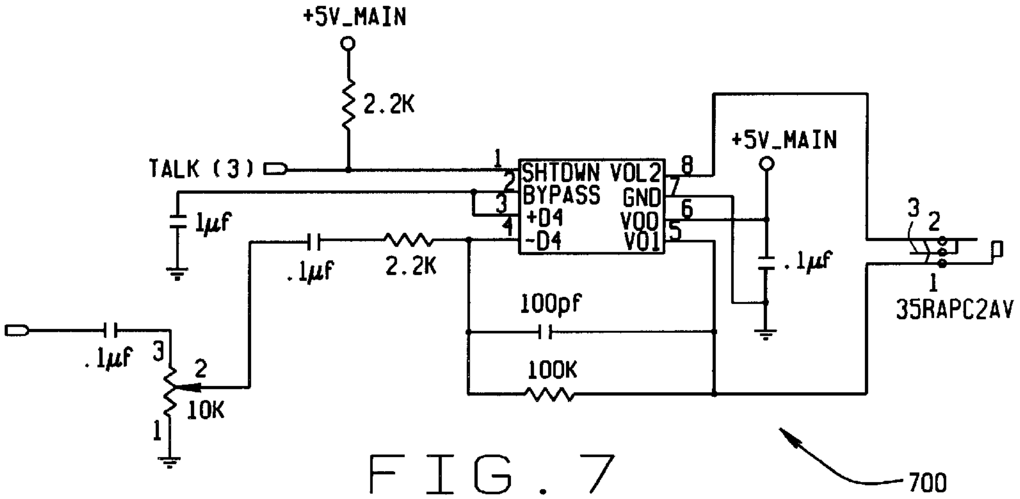
FIG. 7 is a schematic diagram of an audio amplifier exemplifying one embodiment of the amplifier shown in FIG. 3.

FIG. 7 is a schematic diagram of an audio amplifier 700 that, in one embodiment, is included in audio output 318 (shown in FIG. 3). Connector 600 and amplifier 700 are of substantially conventional design and, accordingly, are not described in detail.

Figure 8:
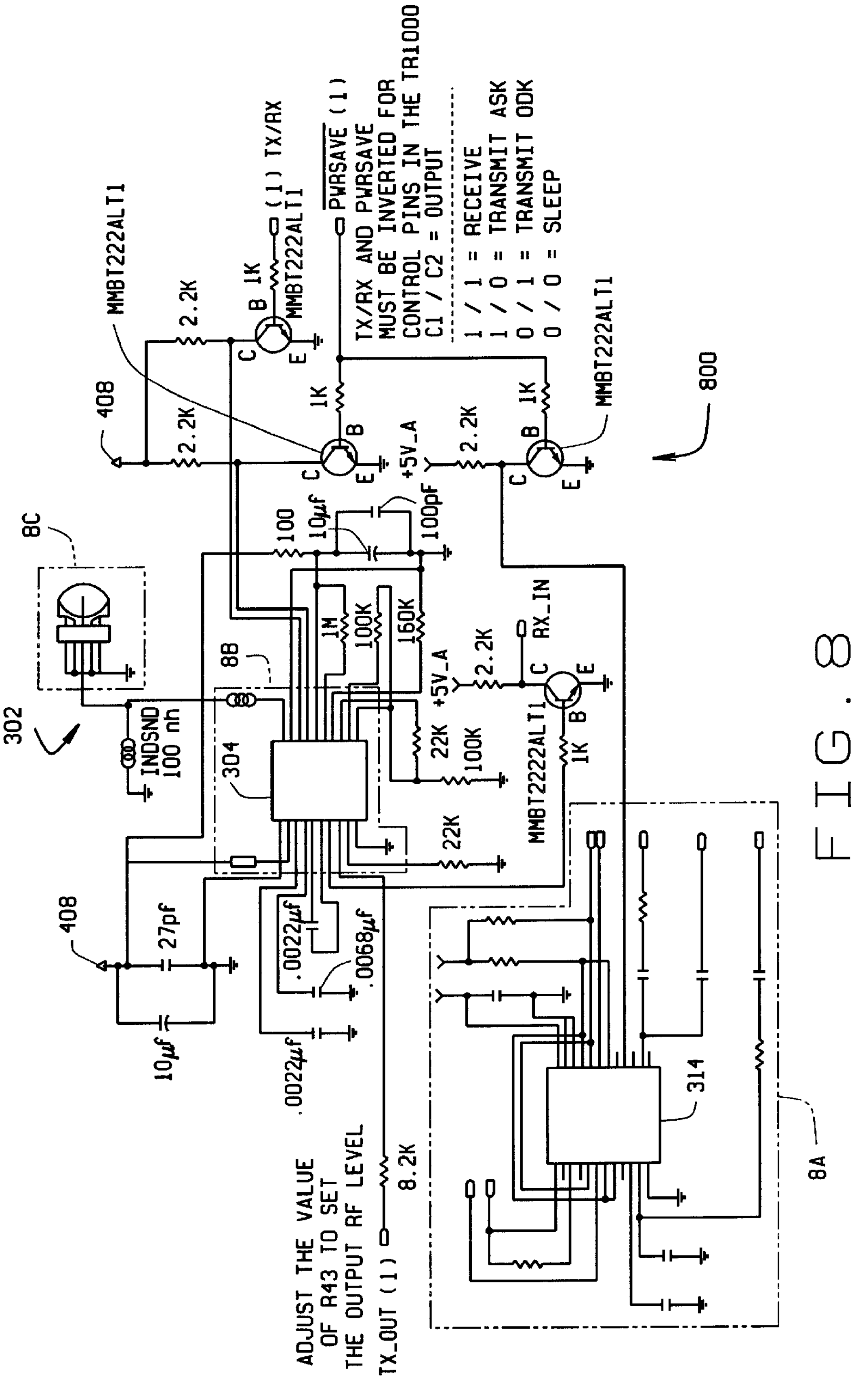
FIG. 8 is a schematic diagram of a receive and transmit module amplifier.
Figure 8A:
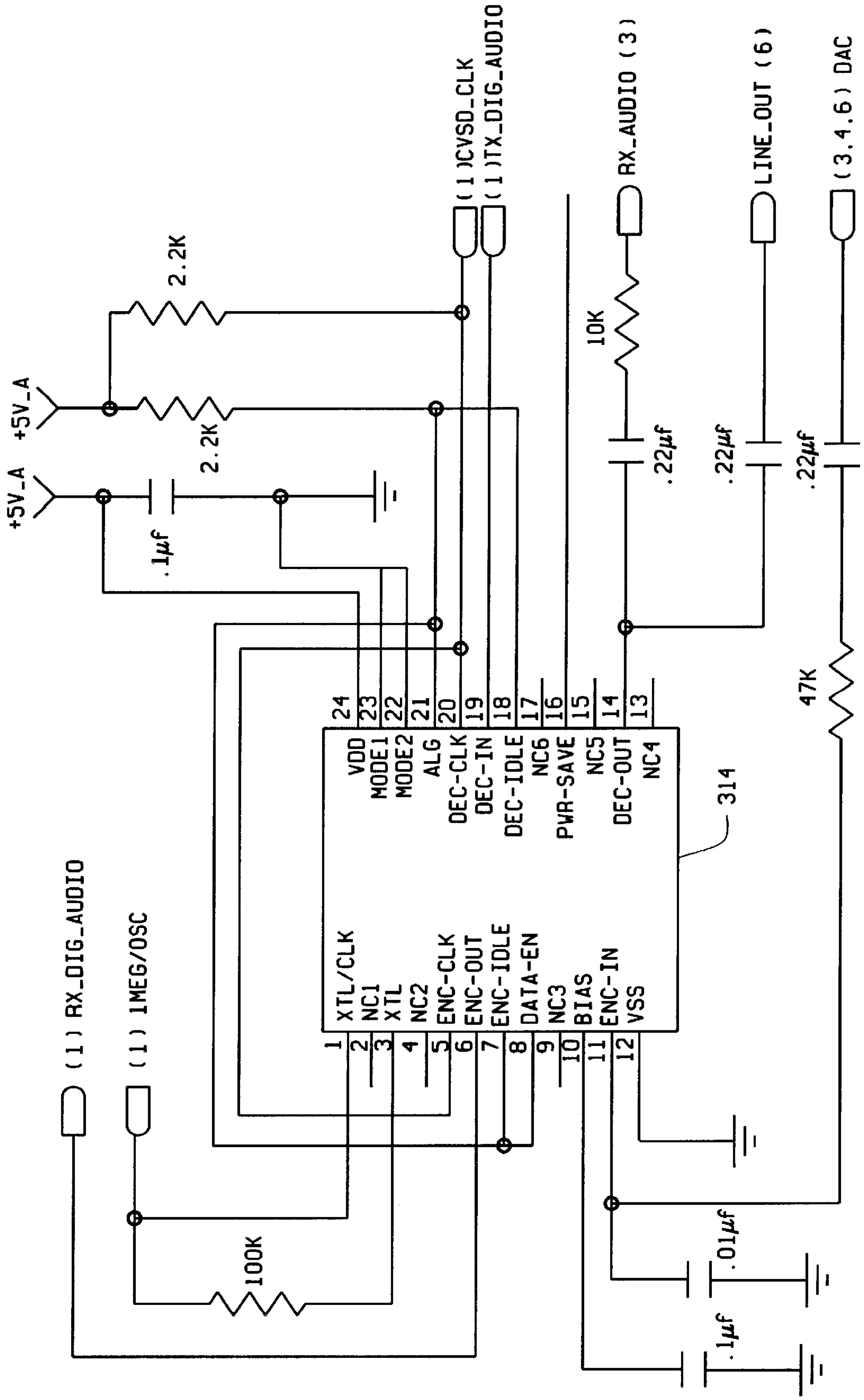
FIG. 8A is an enlarged view of the speech recognition unit shown in FIGS. 3 and 8.
Figure 8B:
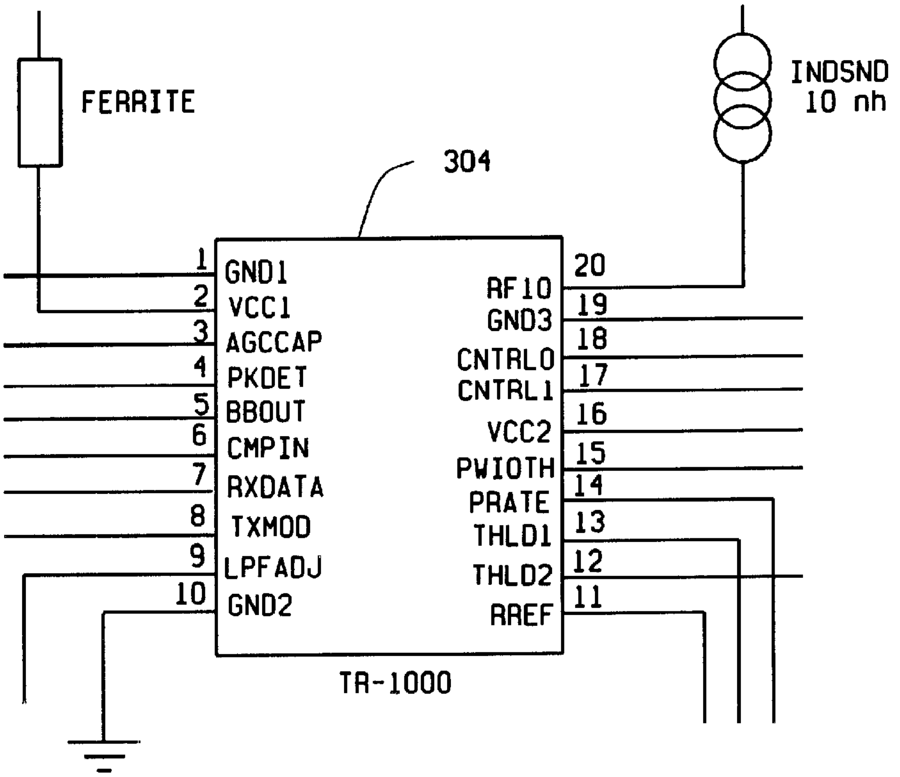
FIG. 8B is an enlarged view of the WTWR shown in FIG. 8.
Figure 8C:
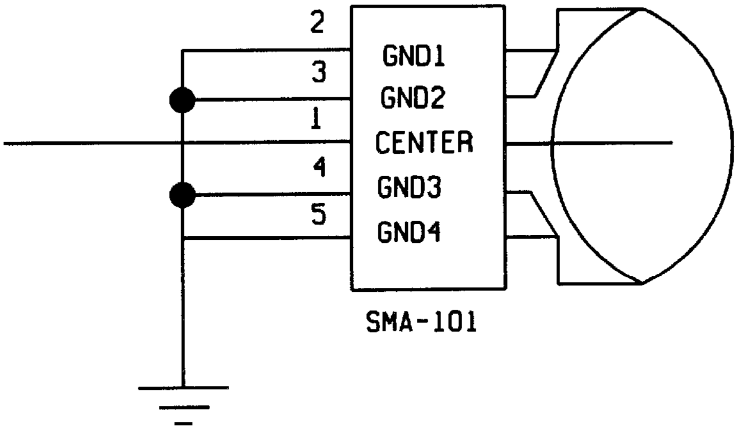
FIG. 8C is an enlarged view of a portion of the amplifier shown in FIG. 8.

FIG. 8 is a schematic diagram of a receive and transmit module amplifier 800 including WTWR 304 (shown in FIG. 3), antenna 302 (shown in FIG. 3), and CVSD 306 (shown in FIG. 3). Amplifier 800 is powered by 3.3 volt power supply feed 408 from power supply circuit 202 (shown in FIG. 4). FIG. 8A is an enlarged view of speech recognition unit 314 (shown in FIGS. 3 and 8). FIG. 8B is an enlarged view of WTWR 304 (shown in FIG. 8). FIG. 8C is an enlarged view of a portion of amplifier 800 (shown in FIG. 8).

Figure 10:
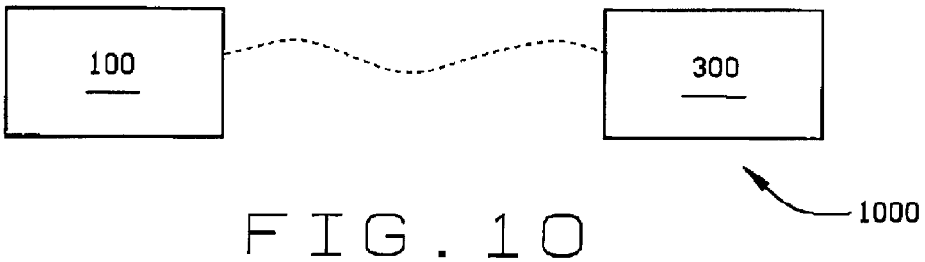
FIG. 10 is a block diagram of a remote voice activation system.
Figure 9:
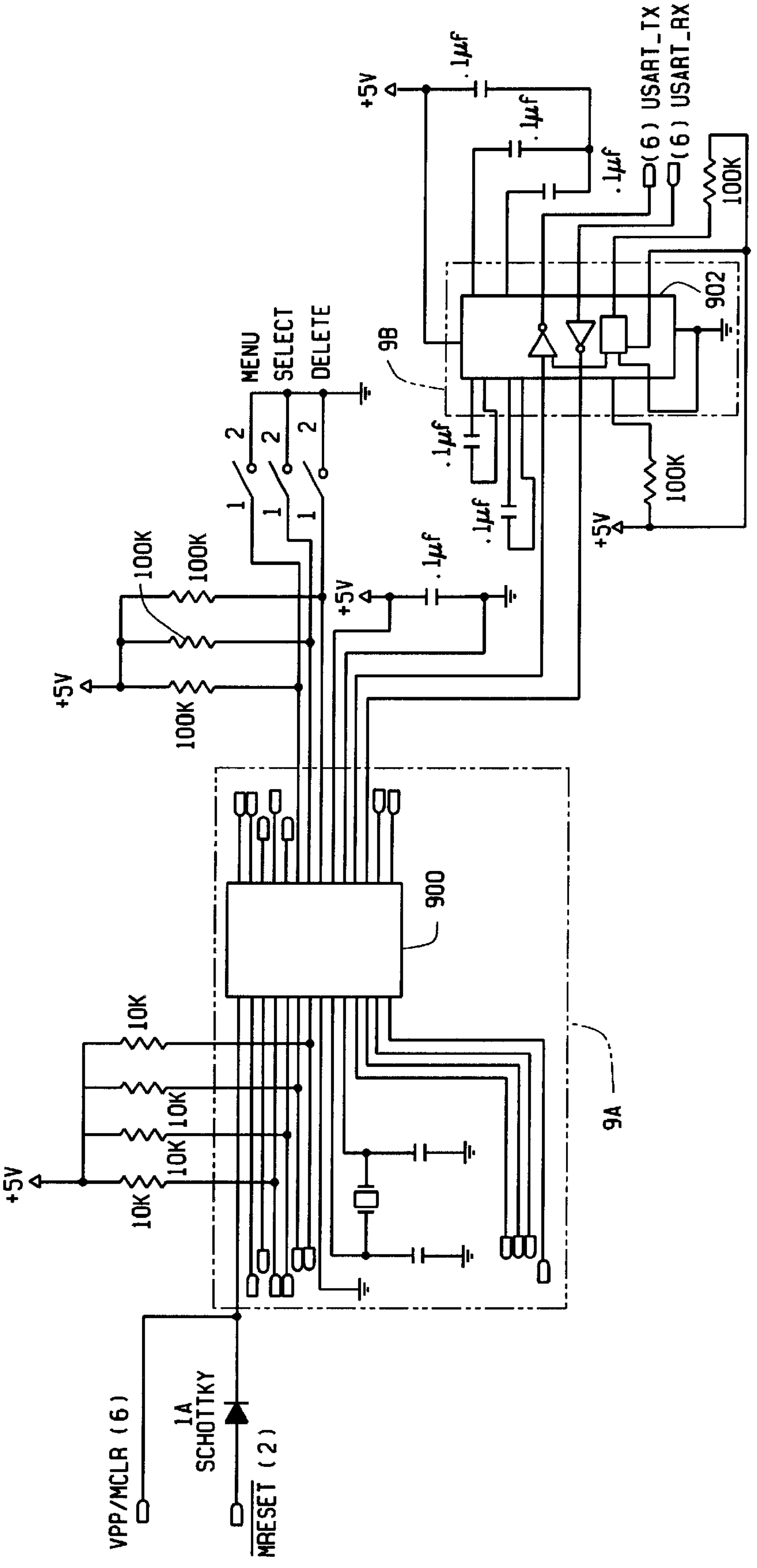
FIG. 9 is a schematic diagram of a micro-controller.
Figure 9A:
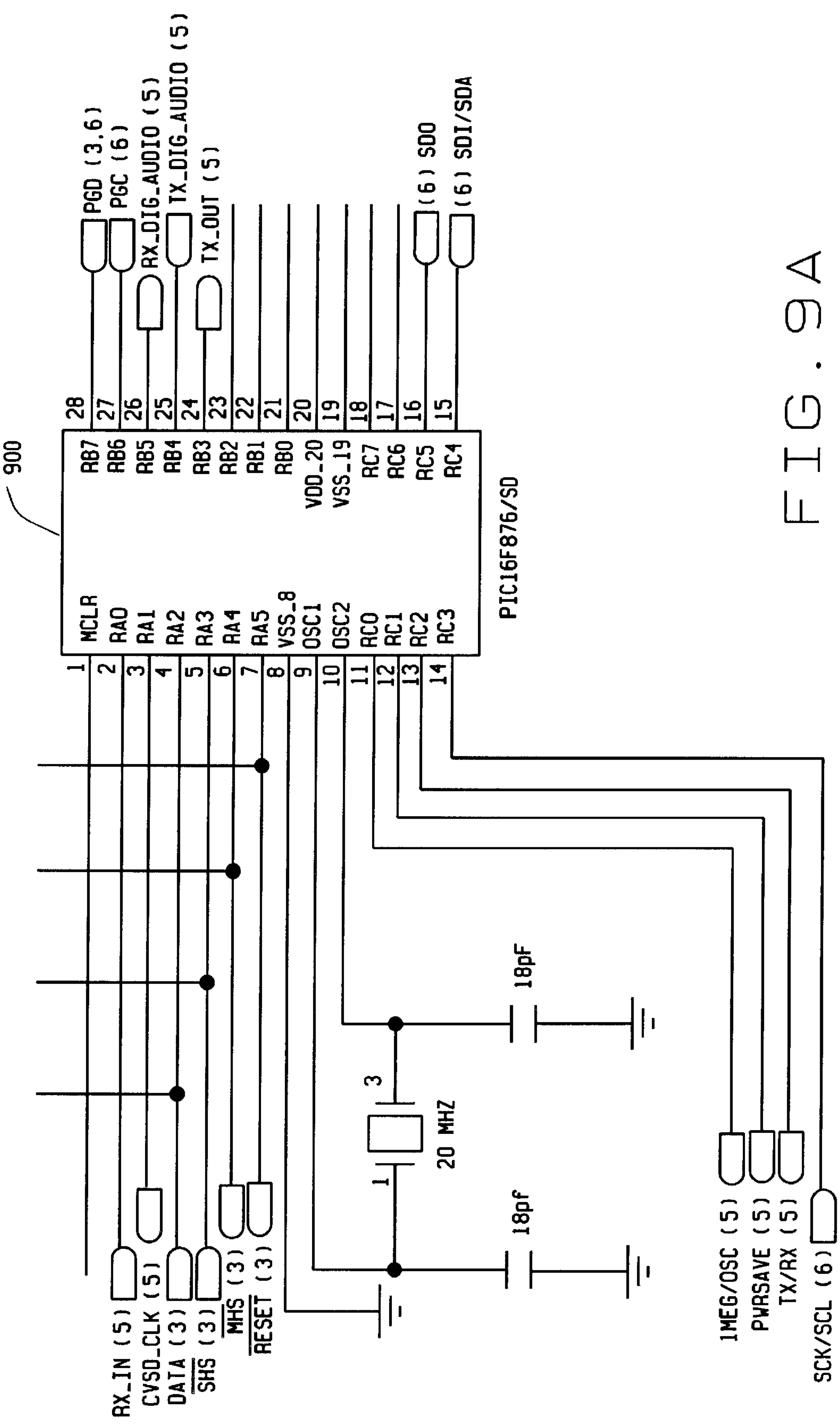
FIG. 9A is an enlarged view of the micro-controller shown in FIG. 9.
Figure 9B:
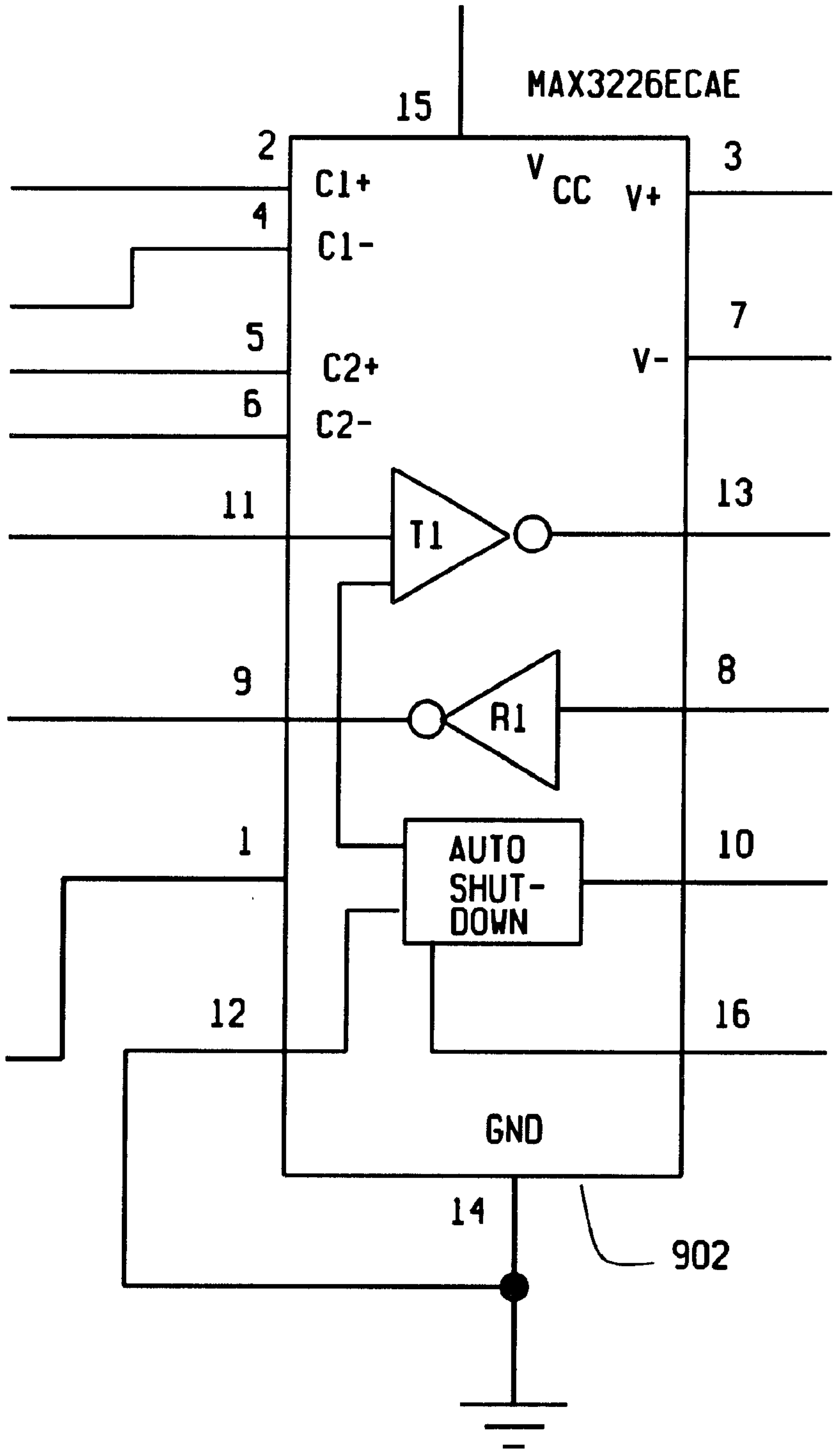
FIG. 9B is an enlarged view of a communication interface.

FIG. 9 is a schematic diagram of a micro-controller 900 suitable for use as micro-controller 310 (shown in FIG. 3). FIG. 9A is an enlarged view of micro-controller 900 (shown in FIG. 9), and FIG. 9B is an enlarged view of a communication interface 902. FIG. 10 is a block diagram of a secure remote voice activation system 1000 including controller 100 (shown in FIG. 1) and base station 300 (shown in FIG. 3) in wireless communication. As explained above, controller 100 transmits an ID, a password, and at least one voice command. Base station 300 receives the transmissions from controller 100, and base station 300 controls controlled device 320 (shown in FIG. 3). In an exemplary embodiment, secure remote voice activation system 1000 is an automobile remote voice activation system.

While the invention has been described in terms of various specific embodiments, those skilled in the art will recognize that the invention can be practiced with modification within the spirit and scope of the claims.

What is claimed is:

1. A method of remotely generating a control signal prompted by an audible voice command, said method comprising the steps of:

receiving an audible voice password in a remote controller;

digitizing the voice password;

transmitting an ID and the digitized password from the remote controller to a base station;

confirming the ID;

performing speech recognition on the password;

confirming the password;

receiving an audible voice command in the controller;

digitizing the command;

transmitting the digitized command from the controller to the base station;

performing speech recognition on the command;

confirming the command to indicate transmission of a desired control signal by the base station; and transmitting the control signal from the base station in response to the command.

2. A method according to claim 1 wherein said step of confirming the ID further comprises the step of transmitting an ID confirmation from the base station to the controller.

3. A method according to claim 2 wherein said step of transmitting an ID confirmation further comprises the step of generating an audible signal from the controller.

4. A method according to claim 1 wherein said step of transmitting an ID further comprises the step of transmitting wirelessly an ID from the remote controller to the base station, said step of transmitting the digitized voice password further comprises the step of transmitting wirelessly the digitized voice password from the controller to the base station, said step of transmitting the digitized command further comprises the step of transmitting wirelessly the digitized command from the controller to the base station.

5. A method according to claim 1 further comprising the step of converting the digitized voice command to an analog voice command in the base station before confirming the command.

6. A method according to claim 1 wherein said step of transmitting the digitized voice command further comprises the steps of:

encrypting the voice command; and transmitting an encrypted digitized voice command from the controller to the base station.

7. A method according to claim 1 wherein said step of transmitting the digitized voice command further comprises the steps of:

encoding the voice command such that the command is Manchester encoded;and transmitting the Manchester encoded digitized voice command from the controller to the base station.

8. A method according to claim 1 further comprising the step of searching for other remote controllers before transmitting an ID.

9. A method according to claim 8 wherein said step of searching further comprises the step of searching for a Manchester encoded signal.

10. A method according to claim 9 wherein said step of searching for a Manchester encoded signal further comprises the steps of:

attempting to receive a Manchester encoded signal;

attempting to derive a Manchester clock; and disabling transmission of data from the controller if a Manchester clock is derived.

11. A method according to claim 1 wherein said step of confirming the ID further comprises the steps of:

transmitting the ID from the base station to the controller;

transmitting an ID confirmation from the base station to the controller; and generating an audible signal from the controller.

12. A method according to claim 1 wherein said step of transmitting the control signal from the base station further comprises the step of generating an audible confirmation from the base station.

13. A method according to claim 12 wherein said step of generating an audible confirmation further comprises the step of generating a phonemic audible confirmation.

14. A method according to claim 1 wherein said step of transmitting the control signal from the base station further comprises the step of generating an audible signal from the controller.

15. A method according to claim 1 wherein said step of transmitting the control signal from the base station further comprises the steps of:

generating an audible signal from the base station; and generating an audible signal from the controller.

16. A method according to claim 1 wherein said step of confirming the ID further comprises the step of confirming the ID to enable receipt of a digitized voice password by the base station.

17. A method according to claim 1 wherein said step of confirming the password further comprises the step of confirming the password to enable receipt of a digitized voice command by the base station.

18. A remote voice activation system comprising:

a controller configured to receive an audible password from a user, said controller further configured to digitize the password and make a wireless transmission of an encoded digital ID and the digitized password;

a base station in wireless communication with said controller, said base station configured to receive the encoded digital ID for identification of said controller, said base station further configured to receive the digitized password, said base station comprising:

a speech recognition unit with supporting memory to generate at least one control signal in response to receipt of a voice command;

a micro-controller electrically coupled to said speech recognition unit, said micro-controller configured to receive the control signal from said speech recognition unit; and a data bus interface electrically coupled to said micro-controller, said data bus interface configured to transmit the control signal.

19. A system according to claim 18 wherein said base station further comprises an audio output electrically coupled to said speech recognition unit, said audio output configured to generate an audible confirmation of the transmission of the control signal.

20. A system according to claim 19 wherein the audible confirmation comprises an audible phonemic confirmation.

21. A system according to claim 18 wherein said base unit further comprises a slope modulator electrically coupled to said micro-controller, said modulator configured to convert the digitized password to an analog password.

22. A system according to claim 21, wherein said modulator further configured to decode said digitized password.

23. A system according to claim 18 wherein said controller comprising:

a micro-controller; and a power supply circuit comprising:

an N-Channel mosfet electrically connected to a battery and said micro-controller;

a pnp transistor electrically connected to the battery in parallel to said mosfet; and a switch mode power supply with boost mode topology electrically connected to said transistor and said micro-controller.

24. A system according to claim 18 wherein said controller further configured to encode the digitized password.

25. A system according to claim 18 wherein said controller further configured to search for an encoded signal before transmitting the ID and the password.

26. A system according to claim 18 wherein said controller comprises an audio output configured to generate an audible confirmation if the ID is a valid ID.

27. A system according to claim 18 wherein said controller further configured to:

receive a voice command from the user;

digitize the command; and transmit the digitized command.

28. A system according to claim 27, wherein said controller further configured to encrypt the digitized command.

29. A system according to claim 28, wherein said controller further configured to encode the encrypted digitized command.

30. A system according to claim 18 wherein said base station further configured to:

be mounted in an automobile; and utilize 12 volt electricity.

* * * * *